United States Patent
Moon et al.

(10) Patent No.: US 7,763,379 B2
(45) Date of Patent: Jul. 27, 2010

(54) CAP ASSEMBLY MOLD AND SECONDARY BATTERY HAVING THE SAME

(75) Inventors: Ki eob Moon, Seoul (KR); Seogjin Yoon, Seoul (KR); Heegyu Kim, Seoul (KR); Cheol Woong Lee, Seoul (KR)

(73) Assignee: LG Chem, Ltd. (KR)

( * ) Notice: Subject to any disclaimer, the term of this patent is extended or adjusted under 35 U.S.C. 154(b) by 1220 days.

(21) Appl. No.: 11/338,953

(22) Filed: Jan. 25, 2006

(65) Prior Publication Data

US 2006/0210870 A1 Sep. 21, 2006

(30) Foreign Application Priority Data

Jan. 25, 2005 (KR) .................... 10-2005-0006886

(51) Int. Cl.
*H01M 2/04* (2006.01)
(52) U.S. Cl. .................... 429/163; 429/62; 429/175; 429/181
(58) Field of Classification Search .............. 429/163
See application file for complete search history.

(56) References Cited

U.S. PATENT DOCUMENTS

2002/0142195 A1* 10/2002 Ehara ........................ 429/7
2003/0003357 A1* 1/2003 Tamai et al. ................ 429/181
2004/0251872 A1* 12/2004 Wang et al. ................ 320/112
2005/0208346 A1* 9/2005 Moon et al. ................... 429/7

FOREIGN PATENT DOCUMENTS

JP 2002231201 * 8/2002

* cited by examiner

*Primary Examiner*—Dah-Wei D Yuan
*Assistant Examiner*—Patricia Davis
(74) *Attorney, Agent, or Firm*—Cantor Colburn LLP (57) ABSTRACT

Disclosed herein is a cap assembly mold mounted to a battery cell, in which an electrode assembly including cathodes/separators/anodes is disposed, wherein the cap assembly mold is manufactured by integrally forming a protection circuit board, a safety element, connection terminals, and a cap housing by insert injection molding, and, when the insert injection molding is carried out, the connection terminals are partially exposed from the lower end surface of the cap assembly mold such that the connection terminals can be electrically connected to electrode terminals of the battery cell. According to the present invention, the cap assembly mold is formed by insert injection molding in the state that the protection circuit and the battery are not connected with each other. Consequently, the molding process is carried out using normally available resins, the cap assembly mold is electrically stable, the coating process for preventing electrical short circuits is not necessary, and the possibility of electrical damage to the protection circuit is eliminated.

7 Claims, 6 Drawing Sheets

CAP ASSEMBLY MOLD AND SECONDARY BATTERY HAVING THE SAME

FIELD OF THE INVENTION

The present invention relates to a cap assembly mold for secondary batteries and a secondary battery having the same, and, more particularly, to a cap assembly mold for secondary batteries, which is integrally formed such that the cap assembly mold is mounted to a battery cell, in which an electrode assembly including cathodes/separators/anodes is disposed, and a secondary battery manufactured by coupling the cap assembly mold to the battery cell.

BACKGROUND OF THE INVENTION

Generally, a battery comprises: a battery cell, in which an electrode assembly is mounted; and a cap assembly, which includes a protection circuit board, on which protection circuit chips are mounted, connection terminals, and a cap housing. Specifically, the battery cell includes the electrode assembly, which includes cathodes/separators/anodes, and a case for receiving the electrode assembly such that electrode terminals of the electrode assembly protrude outward from the case and storing a predetermined amount of electrolyte therein. The protection circuit board includes a board part, which is disposed at the upper end of the battery cell and on which a protection circuit electrically connected with the electrode terminals of the battery cell is formed, and external input and output terminals connected to an external device (for example, a wireless terminal, a laptop computer, an electric vehicle, etc.), which is located opposite to the board. The protection circuit board is electrically connected to the battery cell via connection terminals, leads, and a safety element, such as a positive temperature coefficient (PTC) element or a bimetal. These various components are covered by a cap housing while the components are mounted to the battery cell.

Generally, the secondary battery is manufactured by connecting the safety element and the connection terminals (the leads may be further included according to circumstances) to predetermined positions of the battery cell, coupling the protection circuit board to the battery cell, and covering the outside of the battery cell with the cap housing. However, the above-mentioned complicated assembly process is time-consuming even though the assembly process is carried out by skilled workers. Furthermore, the defective ratio during the manufacture of the secondary battery is high due to the multiple steps of the assembly process, and the defective ratio during the use of the secondary battery, especially when external impacts are applied to the secondary battery, is also high due to low coupling force between the components.

In order to solve the above-mentioned problems, there has been proposed a method of manufacturing a secondary battery comprising: placing the battery cell and the cap assembly, which includes the protection circuit board, in a molding device; and injecting resin into the molding device. However, this method has the following problems.

First, the manufacturing process is carried out while the circuit is operated. As a result, when the battery cell and components of the cap assembly are integrally fixed, the battery cell and components of the cap assembly are brought into contact with the molding device, and therefore, the possibility of generating short circuits is very high.

Secondly, when an upper molding unit and a lower molding unit are coupled with each other in the state that the battery cell and components of the cap assembly are temporarily coupled with each other in the molding space of the molding device, the physical pressure is applied to the battery cell depending upon the size of the battery cell, especially, the thickness of the battery cell, and therefore, the possibility of deforming the battery cell is very high.

Thirdly, when melted resin is injected into the molding space of the molding device under high temperature and high pressure, the positions of the battery cell and components of the cap assembly are changed. As a result, the defective product rate is increased.

Fourthly, when the battery cell reaches the high-temperature state in the molding device, the battery characteristics of the battery cell may be changed, and the possibility of explosion of the battery cell is high. Also, when pressure is applied to a battery case, which constitutes the battery cell, in the molding device, the pressure is applied to the welded area of the battery case, where a battery can and a top cap of the battery case are attached to each other by welding, with the result that vents may be formed.

Fifthly, the manufacturing process is carried out while voltage is applied to the battery. For this reason, it is necessary to form a coating layer for preventing occurrence of electrical short circuits at the output terminal side, which is troublesome.

In order to solve the above-mentioned problems, the protection circuit board is integrally formed with the cap housing such that some of the components are formed in the shape of a single body. In this case, however, an assembly step of electrically connecting the safety element, for example, the positive temperature coefficient (PTC) element, the connection terminals, and the leads to the battery cell is further required. As a result, the efficiency of the assembly process is very low even though the number of the assembly steps is reduced.

As described above, the conventional battery manufacturing method has a lot of problems, and therefore, the necessity of a technology to solve the above-mentioned problems is highly increased.

SUMMARY OF THE INVENTION

Therefore, the present invention has been made to solve the above problems, and other technical problems that have yet to be resolved.

Specifically, it is a first object of the present invention to provide a cap assembly mold for secondary battery that is capable of innovatively simplifying the manufacturing process of the battery, reducing the defective product ratio during the manufacture and the use of the battery, and accomplishing easy and convenient handling of the battery.

It is a second object of the present invention to provide a secondary battery including the above-described cap assembly mold.

It is a third object of the present invention to provide a method of manufacturing a secondary battery using the above-described cap assembly mold.

In accordance with one aspect of the present invention, the above and other objects can be accomplished by the provision of a cap assembly mold mounted to a battery cell, in which an electrode assembly including cathodes/separators/anodes is disposed, wherein the cap assembly mold is manufactured by integrally forming a protection circuit board, a safety element, connection terminals, and a cap housing by insert injection molding, and, when the insert injection molding is carried out, the connection terminals are partially exposed from the lower end surface of the cap assembly mold such that the connection terminals can be electrically connected to electrode terminals of the battery cell.

One of the characteristics of the present invention is that the battery can be manufactured by only a single assembly step of electrically connecting the cap assembly mold according to the present invention to the battery cell in the assembly process of the secondary battery. This is possible because the cap assembly mold according to the present invention can be integrally formed with various components of the cap assembly, which constitute the battery, in a separate manufacturing process. Consequently, the manufacturing process of the secondary battery according to the present invention is innovatively simplified as compared to the conventional secondary battery manufacturing method, which requires several assembly steps to mount the cap assembly to the battery cell. Furthermore, the separate manufacture of the cap assembly makes it possible to accurately position the components with high precision and to assemble the components, and secure coupling between the components is accomplished by forming the components integrally with the cap housing.

Preferably, the protection circuit board is a printed circuit board (PCB), on which an electrical circuit constructed to prevent overcharge and overdischarge and allow a rated current to flow is printed. The safety element and the connection terminals are coupled to one-side surface of the protection circuit board, which faces the battery cell, and the protection circuit board is provided at the other-side surface thereof with external input and output terminals, which are connected to a predetermined external device (for example, a wireless terminal, a laptop computer, an electric vehicle, etc.).

The safety element is an element that interrupts current when the battery is overheated due to abnormal operation or overcharge of the battery cell. For example, a positive temperature coefficient (PTC) element, a bimetal, or a fuse may be used as the safety element. It is preferable to use the positive temperature coefficient (PTC) element as the safety element because the positive temperature coefficient (PTC) element can rapidly interrupt the flow of current when the temperature of the battery exceeds a predetermined temperature limit while the positive temperature coefficient (PTC) element can rapidly allow the flow of current to be resumed when the temperature of the battery is lowered below the predetermined temperature limit, and the size of the battery can be reduced through the use of the positive temperature coefficient (PTC) element.

In a preferred embodiment of the present invention, the safety element may be mounted to the protection circuit board as a protection circuit chip before the insert injection molding is carried out.

The connection terminals serve to electrically connect the protection circuit board to the electrode terminals of the battery cell. The connection terminals may be directly connected to the protection circuit board. Alternatively, the connection terminals may be connected to the protection circuit board via the safety element. In the case that the safety element is mounted to the protection circuit board in a circuit manner as a protection circuit chip, the connection terminals are directly connected to the protection circuit board, and DC current transmitted through the connection terminals is transmitted to the external input and output terminals disposed at the other-side surface of the protection circuit board via the safety element of the protection circuit board.

The shape of the connection terminals is not particularly restricted so long as the electrical connection is accomplished by the connection terminals. In a preferred embodiment of the present invention, the connection terminals are constructed such that the middle parts of the connection terminals protrude toward the battery cell, whereby the electrical connection between the connection terminals and the electrode terminals of the battery cell is easily accomplished. More preferably, the protection circuit board is provided with through-holes, and the cap housing, which is integrally formed with the protection circuit board, is also provided with through-holes, which correspond to the through-holes of the protection circuit board, such that the protruding middle parts of the connection terminals communicate with the through-holes from the upper part of the cap assembly mold while the connection terminals are attached to the protection circuit board. In the cap assembly mold with the above-described structure, the upper surfaces of the protruding middle parts of the connection terminals are exposed through the through-holes of the cap housing and the through-holes of the protection circuit board from the upper part of the cap assembly mold. Consequently, it is possible to insert, for example, welding tips through the through-holes while the cap assembly mold is mounted to the battery cell, and attach the cap assembly mold to the battery cell by welding. However, the coupling between the battery cell and the cap assembly mold according to the present invention may be accomplished by other coupling methods instead of welding, which will be described below.

The connection terminals are exposed from the lower end surface of the cap assembly mold such that the connection terminals can be electrically coupled to the electrode terminals of the battery cell.

According to circumstances, additional leads may be further included to easily accomplish the electrical coupling between the connection terminals and the electrode terminals of the battery cell. In this case, these leads may be integrally formed with the cap assembly mold.

In accordance with another aspect of the present invention, there is provided a secondary battery including the above-described cap assembly mold.

According to the present invention, only the cap assembly is formed by insert injection molding in the state that the protection circuit and the battery are not connected with each other (in the state that the voltage is not applied). Consequently, the molding process is carried out using normally available resins, the cap assembly is electrically stable, the coating process for preventing electrical short circuits is not necessary, and the possibility of electrical damage to the protection circuit is eliminated. Consequently, few defective products are manufactured when the cap assembly is formed of high-temperature and high-pressure melted resin as well as when the cap assembly is formed of low-temperature and low-pressure melted resin. Specifically, resins for low-temperature and low-pressure molding, such as polyamide resin or polyolefin-based resin, and resins for high-temperature and high-pressure molding, such as polyethylene resin or epoxy resin may be used when the insert injection molding process is carried out according to the present invention. Furthermore, other ordinary resins may be used so long as the resins have electrical insulation and do not negatively affect the other components.

Also, according to the present invention, when the secondary battery is defective, the cap assembly mold can be easily separated from the battery such that the cap assembly mold can be remanufactured. In addition, the battery cell and the circuit part are individually manufactured, and therefore, the productivity is increased. Furthermore, the cap assembly can be formed by molding without the battery cell. Consequently, it is possible to prevent the reduction in stability of the battery, which is caused by temperature and physical pressure applied to the battery cell when the cap assembly is formed by molding in the molding device together with the battery cell. Moreover, it is possible to prevent the occurrence of defective products due to the size errors of the battery cell in the specific-sized molding unit, in which the battery cell is fixed.

A lithium secondary battery or a nickel metal hydride (NiMH) secondary battery may be used as the secondary battery according to the present invention. Preferably, the lithium secondary battery is used as the secondary battery according to the present invention because the lithium secondary battery has high output voltage and extended service life.

In accordance with yet another aspect of the present invention, there is provided a method of manufacturing a secondary battery using the above-described cap assembly mold. Specifically, the secondary battery manufacturing method comprises the steps of: coupling a cap assembly mold to a battery cell having electrode terminals formed at the upper part thereof such that connection terminals of the cap assembly mold are brought into contact with the electrode terminals of the battery cell.

The coupling between the battery cell and the cap assembly mold may be accomplished by various coupling methods, for example, welding, such as spot welding or laser welding, adhesion, which is carried out using an adhesive, or engagement, which is carried out by engaging members and engaging grooves formed at the battery cell and the cap assembly mold, respectively. However, the coupling between the battery cell and the cap assembly mold is not restricted to the above-specified coupling method.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF MAIN REFERENCE NUMERALS OF THE DRAWINGS

100: secondary battery
300: cap assembly
310, 312: connection terminals
330: cap housing
200: battery cell
301: cap assembly mold
320: protection circuit board

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
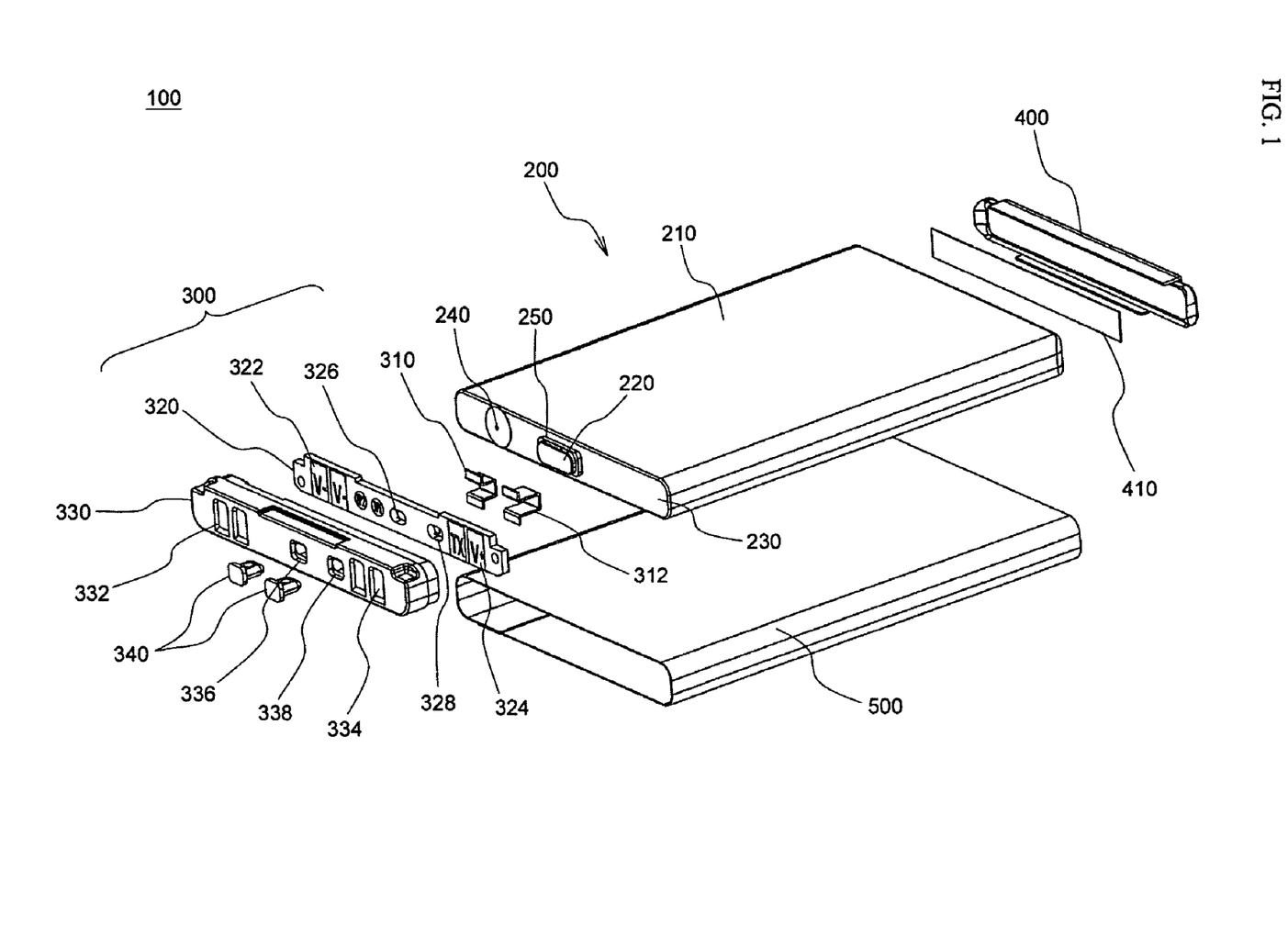
FIG. 1 is an exploded perspective view illustrating a secondary battery according to a preferred embodiment of the present invention.
Figure 2:
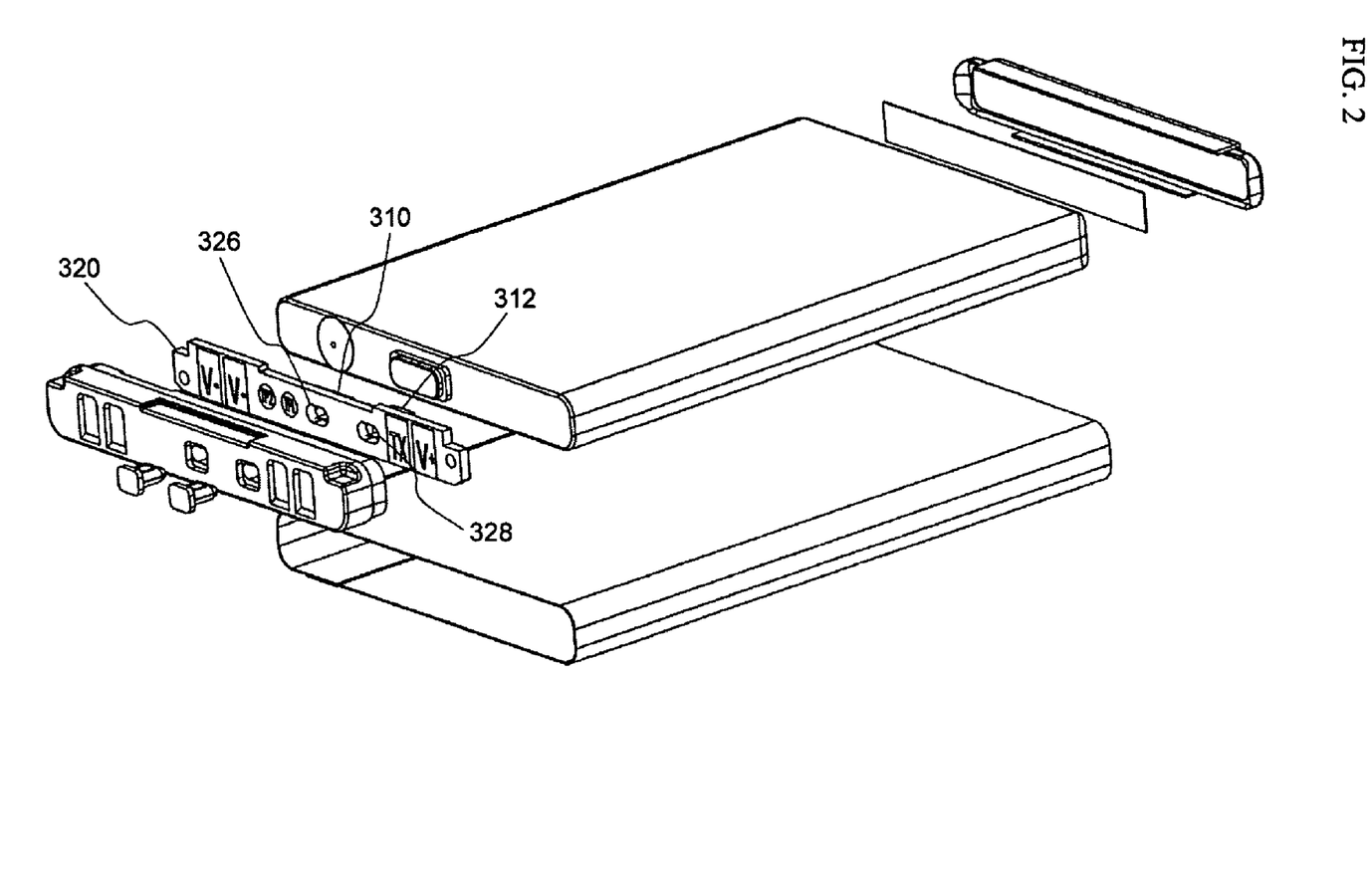
FIG. 2 is a perspective view illustrating the connection terminals coupled to the protection circuit board of the secondary battery shown in FIG. 1.

FIG. 1 is an exploded perspective view illustrating a secondary battery according to a preferred embodiment of the present invention, and FIG. 2 is a perspective view illustrating the connection terminals coupled to the protection circuit board of the secondary battery. These drawings are provided to assist in understanding the present invention.

Referring first to FIG. 1, the secondary battery 100 comprises a battery cell 200, in which an electrode assembly (not shown) including cathodes/separators/anodes is mounted while the electrode assembly is impregnated with an electrolyte, and a cap assembly 300.

The battery cell 200 includes a rectangular can 210, which is made, for example, of aluminum. The rectangular can 210 itself serves as an electrode terminal (for example, a cathode terminal). At the middle of the upper end of the battery cell 200 is formed another electrode terminal 220 (for example, an anode terminal), which protrudes from the upper end of the battery cell 200. Generally, the electrode assembly is inserted into the rectangular can 210, the upper end of which is open, and then the open end of the rectangular can 210 is covered by a top cap in a sealed fashion. Subsequently, an electrolyte is injected into the battery cell 200 through an electrolyte injection hole 240 formed at one side of the upper end of the battery cell 200. After that, the electrolyte injection hole 240 is closed, and an epoxy resin is applied to the battery cell 200 such that the electrolyte injection hole 240 is covered by the epoxy resin. As a result, the battery cell 200 is prepared in a sealed fashion. The top cap 230, which is coupled to the rectangular can 210, is electrically connected with the rectangular can 210, and therefore, the top cap 230 also serves as the cathode terminal, which is electrically isolated from the anode terminal 220 by an insulating member 250.

The cap assembly 300 includes connection terminals 310 and 312 for connection with the anode terminal 220 and the cathode terminal 230, a protection circuit board 320, a safety element (not shown), and a cap housing 330.

The connection terminals 310 and 312 are constructed such that the middle parts of the connection terminals 310 and 312 protrude toward the battery cell 200. The protruding middle parts of the connection terminals 310 and 312 are coupled to the electrode terminals 220 and 230, respectively, and opposite ends of the connection terminals 310 and 312 are connected to the protection circuit board 320. The first connection terminal 310 is coupled to the protruding anode terminal 220, and therefore, the length of the protruding middle part of the first connection terminal 310 is slightly less than that of the protruding middle part of the second connection terminal 312, which is coupled to the cathode terminal 230.

Although the safety element is not shown in FIG. 1, the safety element is coupled to the lower end surface of the protection circuit board 320.

The protection circuit board 320 is provided at the upper end surface thereof with external input and output terminals 322 and 324. Also, the protection circuit board 320 is provided at predetermined positions thereof, at which the connection terminals 310 and 312 are coupled to the protection circuit board 320, with through-holes 326 and 328.

The cap housing 330 has a size sufficient to cover the protection circuit board 320. The cap housing 330 includes through-holes 332 and 334, through which the external input and output terminals 322 and 324 of the protection circuit board 320 are exposed, and through-holes 336 and 338, which correspond to the through-holes 326 and 328 of the protection circuit board 320, respectively, and which communicate with the protruding middle parts of the connection terminals 310 and 312.

Referring to FIG. 2, the connection terminals 310 and 312 are attached to the lower end of the protection circuit board 320. It can be seen from FIG. 2 that the protection circuit board 320 is exposed through the through-holes 326 and 328.

Referring back to FIG. 1, welding tips (not shown) are inserted through the through-holes 326, 328, 336 and 338 to attach the connection terminals 310 and 312 to the electrode terminals 230 and 220, respectively, by welding while the cap assembly 300 is mounted to the battery cell 200, and then the through-holes 326, 328, 336 and 338 are sealed by sealing caps 340.

The lower end of the battery cell 200 is covered with a bottom cap 400 while an insulating member 410 is disposed between the lower end of the battery cell 200 and the bottom cap 400. After the assembly of the battery 100 is completed, a label 500 is applied to the outer surface of the battery 100.

Figure 3:
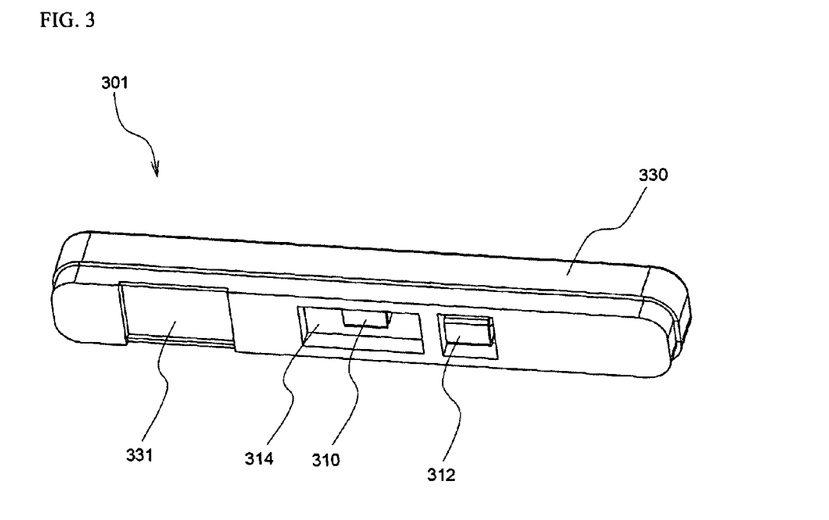
FIG. 3 is a perspective view illustrating the lower surface of a cap assembly mold according to a preferred embodiment of the present invention.

According to the present invention, the cap assembly 300, which includes the cap housing 330, the protection circuit board 320, and the connection terminals 310 and 312, is integrally formed by insert injection molding. FIG. 3 is a perspective view illustrating the lower surface of a cap assembly mold 301, which is integrally formed according to a preferred embodiment of the present invention.

Referring to FIG. 3, the protection circuit board and the safety element are completely covered by the cap housing 330, and therefore, the protection circuit board and the safety element cannot be seen from the outside. Only the first connection terminal 310, which is coupled to the anode terminal (not shown) of the battery cell, and the second connection terminal 312, which is coupled to the cathode terminal (not shown) of the battery cell, are exposed. Since the anode terminal of the battery cell protrudes from the upper end of the battery cell, the first connection terminal 310, which is coupled to the anode terminal, is disposed more deeply in the cap assembly mold 301 than the second connection terminal 312. Also, the first connection terminal 310 has an opening 314, the size of which is large due to the size of the anode terminal and the insulating member 250 (see FIG. 1) disposed around the anode terminal. The cap assembly mold 301 is provided at one side of the lower end surface thereof with a depression 331, which is disposed at a predetermined position corresponding to the electrolyte injection hole (not shown) of the battery cell. The depression 331 is formed in consideration of the thickness of an epoxy resin applied to the battery cell such that the electrolyte injection hole is covered by the epoxy resin.

Figure 4:
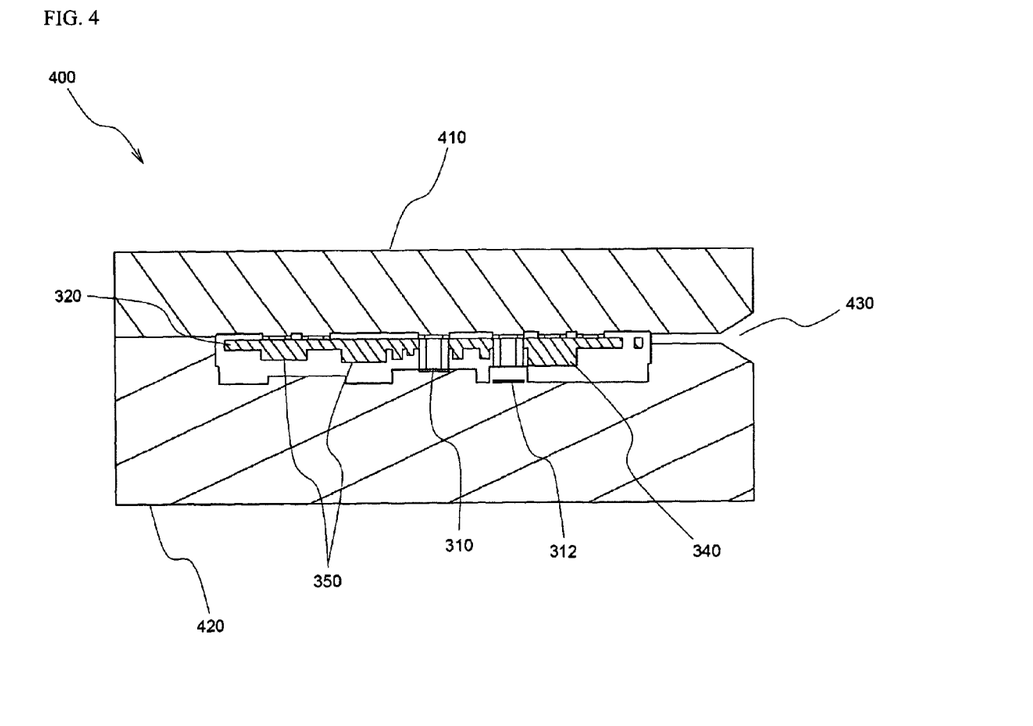
FIG. 4 is a front view, in vertical section, illustrating the cap assembly of FIG. 1 mounted in the molding space of a molding device to manufacture the cap assembly mold of FIG. 3.
Figure 5:
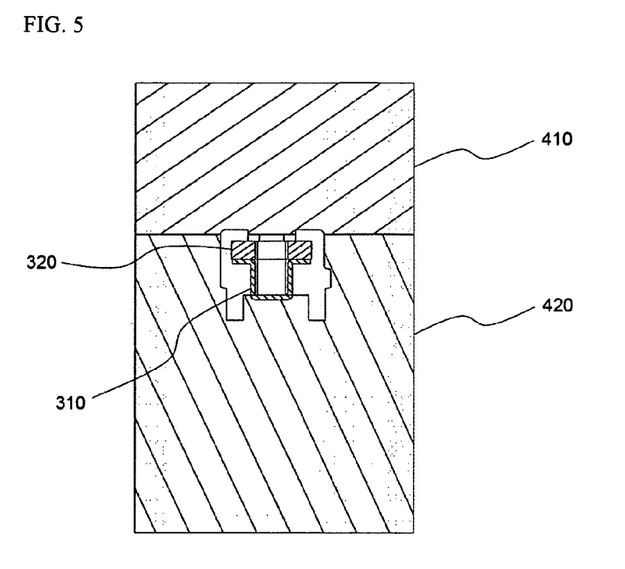
FIG. 5 is a side view, in vertical section, of FIG. 4.

FIGS. 4 and 5 are a front view, in vertical section, and a side view, in vertical section, respectively illustrating the cap assembly of FIG. 1 mounted in the molding space of a molding device to manufacture the cap assembly mold of FIG. 3.

Referring to FIGS. 4 and 5, the protection circuit board 320, the connection terminals 310 and 312, and the safety element 340, for example, a positive temperature coefficient (PTC) element, are placed in the molding space between an upper molding unit 410 and a lower molding unit 420, which are separated from each other, while the protection circuit board 320, the connection terminals 310 and 312, and the positive temperature coefficient (PTC) element 340 are electrically connected with each other. After the upper molding unit 410 and the lower molding unit 420 are coupled with each other, resin is injected into the molding device 400 through a resin injection hole 430 formed at one side of the molding device 400. As a result, the outer surfaces of the protection circuit board 320, the connection terminals 310 and 312, and the positive temperature coefficient (PTC) element 340 are covered by the cap housing. In this way, the cap assembly mold is manufactured. At the lower surface of the protection circuit board 320 is mounted a plurality of protection circuit chips 350 in addition to the positive temperature coefficient (PTC) element 340.

The connection terminals 310 and 312 and/or the positive temperature coefficient (PTC) element 340 may be securely attached to the protection circuit board 320 before the connection terminals 310 and 312 and/or the positive temperature coefficient (PTC) element 340 are placed in the molding space of the molding device 400. According to circumstances, the connection terminals 310 and 312 and/or the positive temperature coefficient (PTC) element 340 may be temporarily attached to the protection circuit board 320.

The resin is not applied to the lower ends of the connection terminals 310 and 312 with the result that the connection terminals 310 and 312 are exposed from the lower end surface of the cap assembly mold after the cap assembly mold is manufactured.

Figure 6:
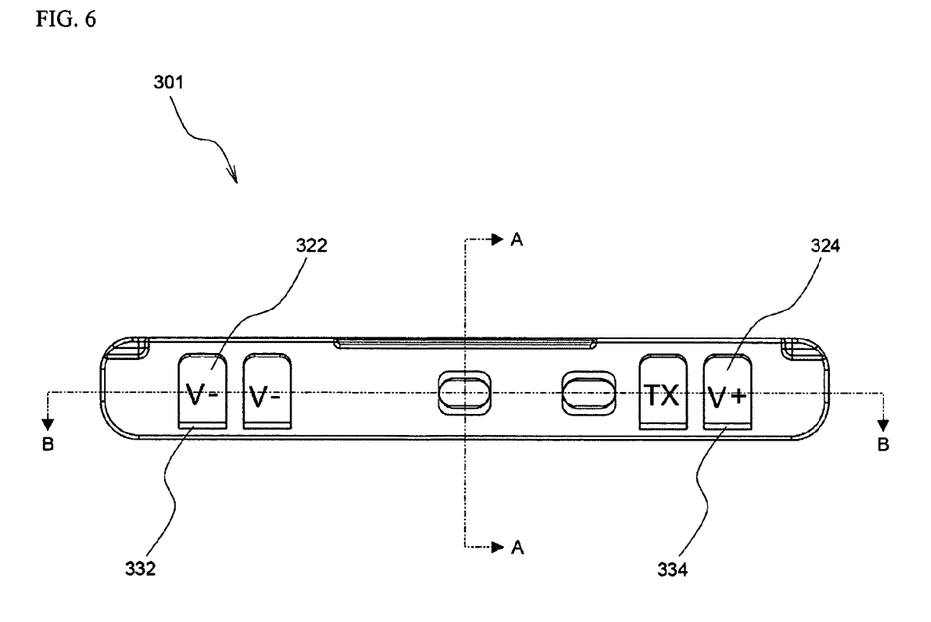
FIG. 6 is a plan view illustrating a cap assembly mold manufactured by the molding device shown in FIG. 4.
Figure 7:
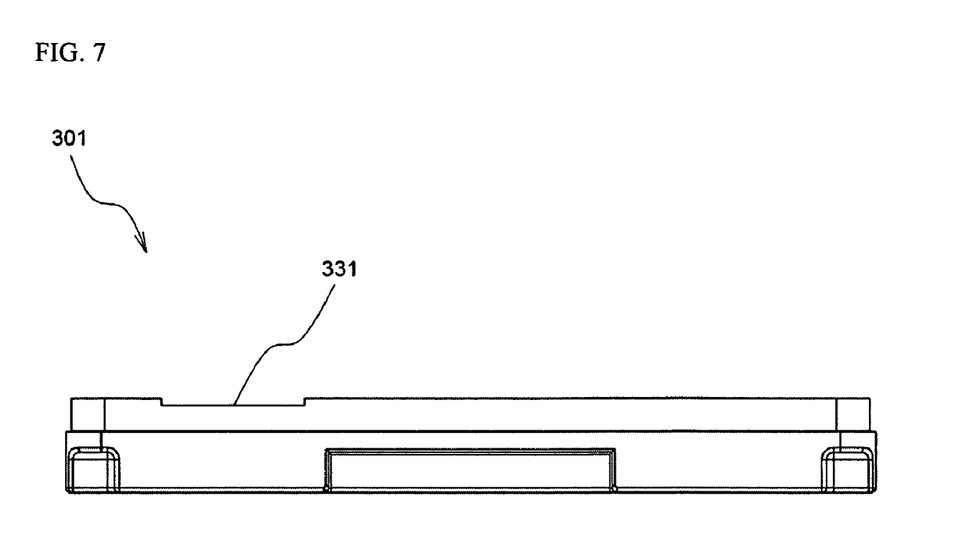
FIG. 7 is a rear view of FIG. 6.
Figure 8:
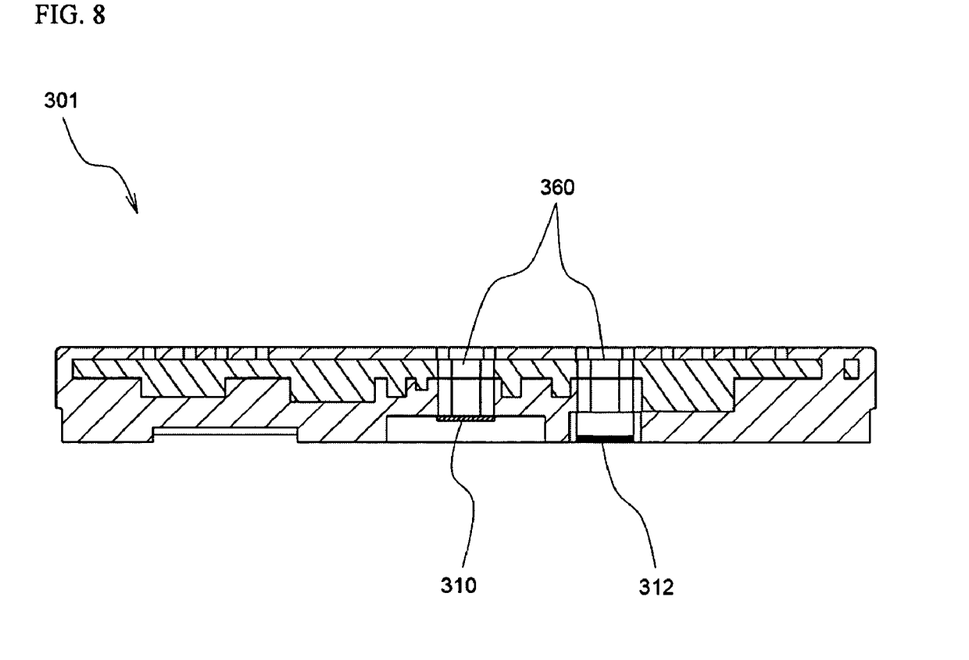
FIG. 8 is a vertical sectional view taken along line A-A of FIG. 6.
Figure 9:
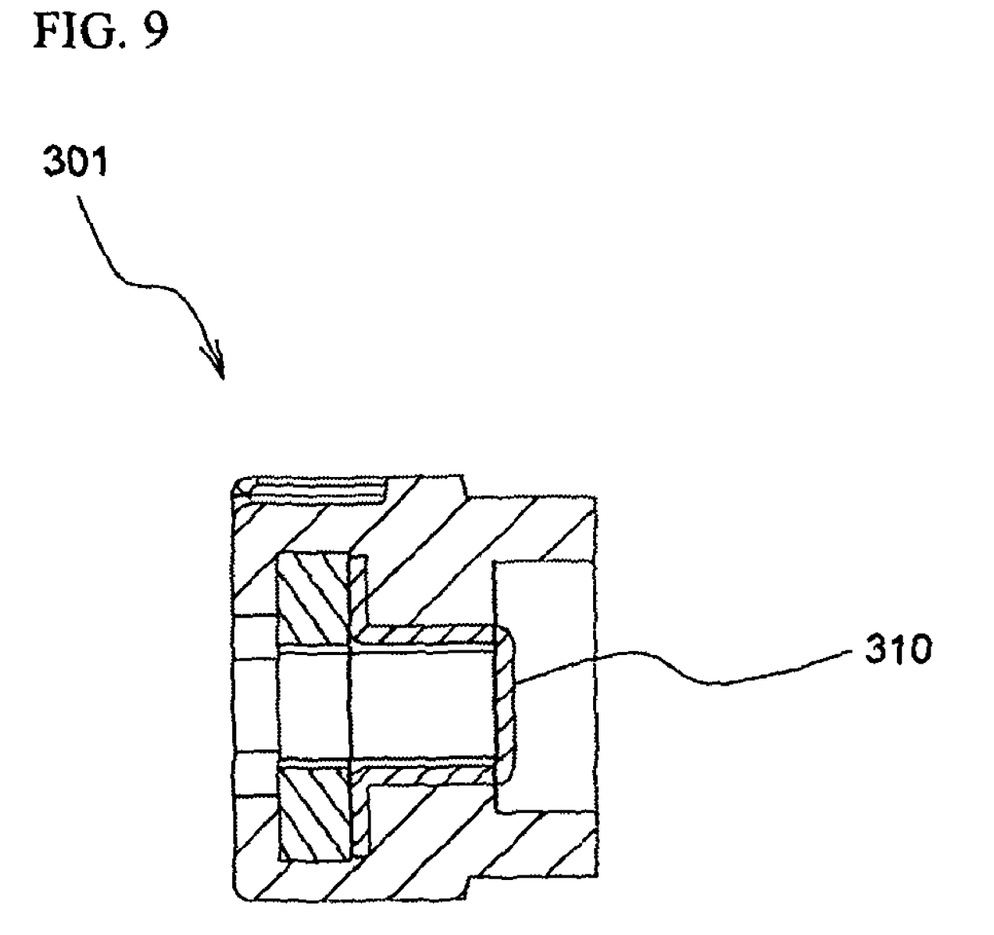
FIG. 9 is a vertical sectional view taken along line B-B of FIG. 6.

FIGS. 6 to 9 illustrate the cap assembly mold 301 manufactured as described above in a plan view (FIG. 6), in a rear view (FIG. 7), in a vertical sectional view (FIG. 8), and in a vertical sectional view (FIG. 9).

Referring to FIGS. 6 and 8, the external input and output terminals 322 and 324 are exposed, through the through-holes 332 and 334 of the cap housing 330, from the upper end of the cap assembly mold 301, and the connection terminals 310 and 312 attached to the lower end of the protection circuit board are partially exposed. As shown in FIG. 9, the lower end of the connection terminal 310 is also exposed from the lower end surface of the cap assembly mold 301.

Referring back to FIGS. 6 and 8, the welding tips (not shown) are inserted through upper opening holes 360 of the connection terminals 310 and 312, while the cap assembly mold 301 is mounted at the upper end of the battery cell 200 (see FIG. 1), to attach the connection terminals 310 and 312 to the electrode terminals 220 and 230 (see FIG. 3) of the battery cell 200 by welding. In this way, the coupling between the cap assembly mold 301 and the battery cell 200 is accomplished. Consequently, in the method of manufacturing the secondary cell according to the present invention, the coupling of the cap assembly 300 to the battery cell 200 is completed by the single step, as described above, and therefore, the manufacturing process of the secondary battery is innovatively simplified as compared to the conventional secondary battery manufacturing method.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

For example, additional leads may be further included to more easily accomplish the electrical coupling between the protection circuit board 320 and the battery cell 200. Preferably, these leads may be integrally included in the cap assembly mold 301 like the other components.

Furthermore, the coupling between the battery cell 200 and the cap assembly mold 301 may be accomplished by adhesion or engagement instead of welding. For example, engaging members and engaging grooves are formed at the battery cell 200 and the cap assembly mold 301, respectively, to accomplish the coupling between the battery cell 200 and the cap assembly mold 301. In this case, the electrical coupling between the connection terminals and the electrode terminals may be accomplished by mechanical elasticity, not by welding.

INDUSTRIAL APPLICABILITY

As apparent from the above description, the protection circuit board, the connection terminals, the safety element, and the cap housing are integrally formed by insert injection molding in the state that the protection circuit and the battery are not connected with each other, i.e., in the state that the voltage is not applied. Consequently, the molding process is carried out using normally available resins, the cap assembly mold is electrically stable, the coating process for preventing electrical short circuits is not necessary, and the possibility of electrical damage to the protection circuit is eliminated. Also, when the secondary battery is defective, the cap assembly mold can be easily separated from the battery such that the cap assembly mold can be remanufactured. In addition, the battery cell and the circuit part are individually manufactured, and therefore, the productivity is increased. Furthermore, the cap assembly can be formed by molding without the battery cell. Consequently, it is possible to prevent the reduction in stability of the battery, which is caused by temperature and physical pressure applied to the battery cell when the cap assembly is formed by molding in the molding device together with the battery cell. Moreover, it is possible to prevent the occurrence of defective products due to the size errors of the battery cell in the specific-sized molding unit, in which the battery cell is fixed.

What is claimed is:

1. A cap assembly mold mounted to a battery cell, in which an electrode assembly including cathodes/separators/anodes is disposed, wherein
    the cap assembly mold is manufactured by integrally forming a protection circuit board, a safety element, two connection terminals, and a cap housing by insert injection molding,
    when the insert injection molding is carried out, the connection terminals are partially exposed from a lower end surface of the cap assembly mold such that the connection terminals can be electrically connected to electrode terminals of the battery cell, and
    wherein the protection circuit board is provided with two through-holes, and the cap housing, which is integrally formed with the protection circuit board, is also provided with two through-holes, which correspond to the through-holes of the protection circuit board, such that a protruding middle portion of each connection terminal communicates with the through-holes from an upper part of the cap assembly mold while the connection terminals are attached to the protection circuit board, and
    wherein the connection terminals have a same shape,
    the protruding middle portion of each connection terminal protrudes toward a battery cell,
    the protruding middle portion of each connection terminal is coupled to a corresponding electrode terminal of the battery cell,
    an end of each connection terminal, which is opposite to the protruding middle portion of each connection terminal, is connected to the protection circuit board, and
    a length of the protruding middle portion of a first connection terminal, which is coupled to a protruding anode terminal of the battery cell, is less than a length of a protruding middle part of a second connection terminal, which is coupled to a cathode terminal of the battery cell.

2. The cap assembly mold according to claim 1,
    wherein the protection circuit board is a printed circuit board (PCB), on which an electrical circuit constructed to prevent overcharge and overdischarge and allow a rated current to flow is printed, and
    wherein the safety element and the connection terminals are coupled to one-side surface of the protection circuit board, which faces the battery cell, and the protection circuit board is provided at the other-side surface thereof with external input and output terminals, which are connected to a predetermined external device.

3. The cap assembly mold according to claim 1, wherein the safety element is a positive temperature coefficient (PTC) element.

4. The cap assembly mold according to claim 1, wherein the safety element is mounted to the protection circuit board as a protection circuit chip before the insert injection molding is carried out.

5. A secondary battery including a cap assembly mold according to claim 1.

6. The secondary battery according to claim 5, wherein the battery is a lithium secondary battery.

7. A cap assembly, comprising:
    a protection circuit board having through-holes, a first surface and a second surface opposite to the first surface;
    connection terminals on the protection circuit board, the connection terminals each having a protruding middle portion; and
    a cap housing on the first surface of the protection circuit board, the cap housing having through-holes, which correspond to the through-holes of the protection circuit board;
    wherein the protruding middle portion of each connection terminal communicates with a corresponding through-hole of the cap housing,
    the protruding middle portion of each connection terminal protrudes from the second surface of the protection circuit board,
    an end of the connection terminal, which is opposite to the protruding middle portion, is connected to the protection circuit board, and
    a length of the protruding middle portion of a first connection terminal, which corresponds to an anode terminal of a battery, is less than a length of the protruding middle portion of a second connection terminal, which corresponds to a cathode terminal of the battery.

* * * * *